(12) United States Patent
Mc Cord et al.

(10) Patent No.: US 6,474,502 B2
(45) Date of Patent: Nov. 5, 2002

(54) SYSTEM FOR STORING AND MAKING AVAILABLE GAS BOTTLES

(75) Inventors: Anthony Mc Cord, Paris Cedex (FR); Pierre Pic, La Ciotat Cedex (FR); Yves Le Nevez, La Ciotat Cedex (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 46 days.

(21) Appl. No.: 09/803,102

(22) Filed: Mar. 12, 2001

(65) Prior Publication Data

US 2001/0022306 A1 Sep. 20, 2001

(30) Foreign Application Priority Data

Mar. 10, 2000 (FR) .............................................. 00 03124

(51) Int. Cl.[7] .............................................. B65G 59/00
(52) U.S. Cl. ......................................... 221/131; 312/72
(58) Field of Search ................................ 221/2, 3, 6, 7, 221/9, 13, 131, 129, 208; 312/45, 72, 97.1

(56) References Cited

U.S. PATENT DOCUMENTS

| 3,179,224 A | 4/1965 | Haupt, Sr. et al. |
| 4,893,705 A | 1/1990 | Brown |

FOREIGN PATENT DOCUMENTS

| DE | 699 384 | 9/1938 |
| DE | 197 16 138 | 10/1998 |
| FR | 2.117.113 | 7/1972 |
| FR | 2 423 190 | 11/1979 |
| FR | 2 641 887 | 7/1990 |
| FR | 2 657 707 | 8/1991 |
| FR | 0 848 359 | 6/1998 |
| FR | 2 757 249 | 6/1998 |

*Primary Examiner*—Kenneth W. Noland
(74) *Attorney, Agent, or Firm*—Young & Thompson

(57) ABSTRACT

The system comprises at least one cabinet (A) having several compartments for containing bottles, each compartment consisting of a generally half-cylindrical gutter part (5) and an access part (6) that converges toward the gutter part and opens at the front of the cabinet, where it can be closed by a door (13) fitted with a bolt (15) controlled by a transaction module (B). Applicable to the on-site distribution of industrial gas bottles.

17 Claims, 2 Drawing Sheets

SYSTEM FOR STORING AND MAKING AVAILABLE GAS BOTTLES

The present invention relates to systems for storing and making available gas bottles.

In known systems the gas bottles are usually stored vertically. It has however been proposed that they should be stored horizontally in systems where they are dispensed by gravity or in lockers or on moving belts. These types of system are space-hungry, unreliable, tend to break down and are in practice unsuitable for small or medium-size bottles.

It is an object of the present invention to provide a system of simple, robust, modular and versatile configuration, that is of low manufacturing and cost price and is suitable for a large number of uses.

For this purpose the invention provides a system for storing and making available gas bottles, comprising at least one cabinet that has a front face and comprises at least one pair of front-opening compartments connected to selective access-control means, each compartment consisting of a generally half-cylindrical gutter part and an access part whose profile converges toward the gutter part.

Other more specific features of the invention are as follows:

each compartment is fitted with a door with a bolt at least the access part, and typically also at least part of the door, are made of plastic or a non-magnetic material each compartment is equipped with a detector for detecting the presence of a bottle and/or for reading information carried by the bottle.

Figure 1:
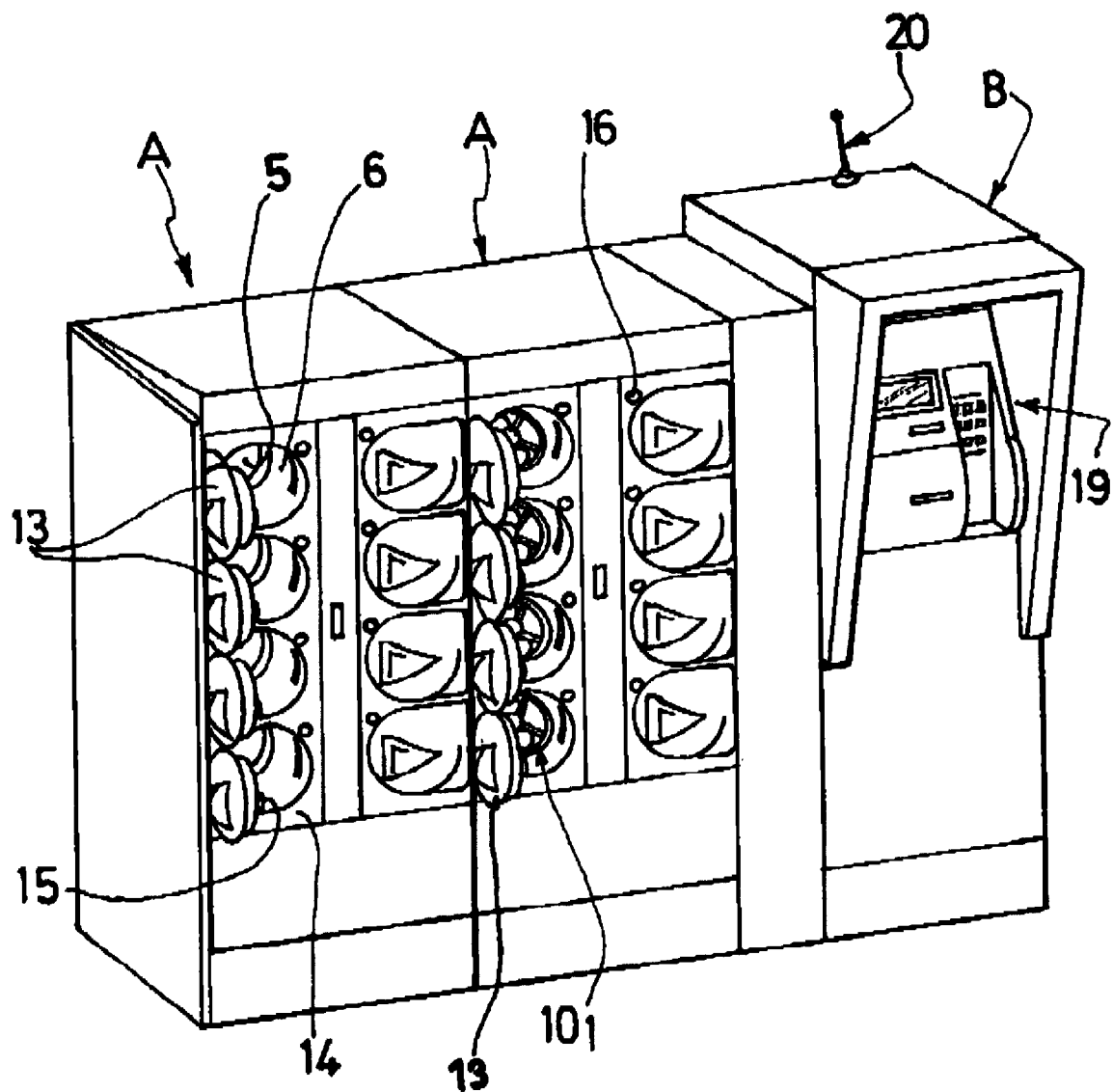
Figure 2:
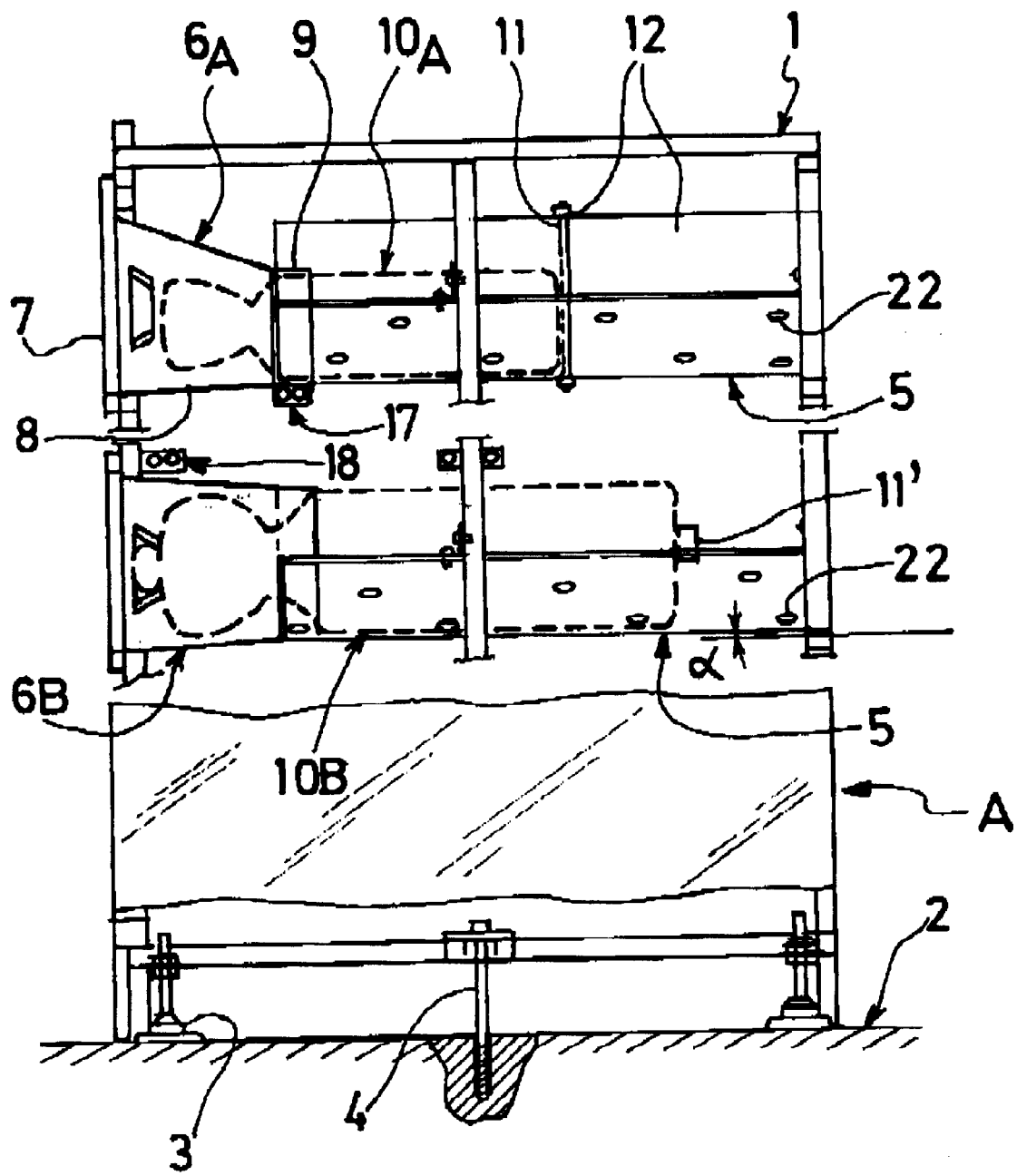

Other features and advantages of the present invention will emerge from the following description of one embodiment, provided purely as a non-limiting illustration. The description relates to the accompanying drawings, in which:

FIG. 1 is a schematic perspective view of a stand-alone system for storing and making available bottles of gas according to the invention; and FIG. 2 is a schematic view in vertical cross section of a cabinet of the system of FIG. 1.

In the embodiment illustrated in FIG. 1, a system according to the invention comprises two adjacent storage and distribution cabinets A, typically comprising two vertical columns of 4 compartments for bottles, and a cabinet B, also advantageously adjacent, forming a transaction module.

In the embodiment illustrated, each cabinet A comprises a braced load-bearing frame 1 which stands on the ground 2 via adjustable feet 3 and is anchored to the ground by a tie rod 4. The cabinet A typically encloses two vertical series of compartments, each formed of a gutter part 5 mounted in the frame 1 and a front access part 6 which is open to the front face of the cabinet A. The gutter part 5 is typically composed of at least one half-cylindrical gutter, or, as shown at the top of FIG. 2, two half-cylindrical half-shells assembled along the generatrices, while the access part 6 consists of a generally frustoconical molding exhibiting, as one moves away from the front mounting plate 7, a profile that converges toward the rear 8 and ends in an essentially cylindrical rear end 9 that extends into the front part of the gutter part 5.

To accommodate different sizes of bottles and bottle tops, as indicated by the outlines in dashed lines 10a and 10b in FIG. 2, the gutter part 5 comprises an adjustable transverse end stop means against which the bottle can rest in the compartment. The end stop may take the form of a threaded rod 11 mounted in one of a series of diametrically opposite holes 12 formed in the gutter part 5 and at precise locations along generatrices of the latter, or of a crosspiece 11' fixed at the appropriate point in the gutter. In the same spirit, in accordance with one aspect of the invention, the access part 6 is selected from a predetermined group of access parts having different shapes adapted to the different bottles and tops that will be stored, as illustrated by the two parts 6a and 6b in FIG. 2.

To ensure satisfactory positioning of the bottle 10 as far as it will go with its bottom against the end stop member 11 and where necessary to allow a constituent to drain to the bottom of the bottle, the gutter parts 5 slope downhill from the front face, at an angle α of between about 3 and 15°, sufficient to overcome the friction between a bottle 10 and the material of the gutter part 5.

As can be seen in FIG. 1, each compartment can be closed by a door 13 hinged to a front panel 14 covering the panels 7 and fixed to the frame. Each door 13 has a handle, an electromagnetic bolt 15 and a gasket to prevent the ingress of drops or dirt into the compartments. Each compartment has a luminous indicator 16 to indicate the presence or absence of a full or empty bottle in the compartment. Its presence is detected by at least one bottle presence sensor 17, which may be of magnetic or inductive type, or preferably by an ultrahigh-frequency aerial 18 located at the periphery of the access part 6 and capable of interrogating an electronic chip attached to the top of the bottle 10. For this purpose, according to one aspect of the invention, at least the access part 6 is a plastic molding of, for example, PTFE. The door 13 is advantageously also at least partly a plastic molding. The gutter 5 is advantageously made of sheet metal perforated with holes 22 through which fluids can pass.

With such an arrangement, the transaction module B, which includes in particular an information exchange unit 19 comprising a keyboard, a display screen, a slot for the insertion of identification cards and a slot for outputting a transaction record, and is connected to the various sensors 17 and 18 and to the strikes of the bolts 15, can autonomously manage the return and removal of bottles, which are individualized as a function of the identified client, being connected, by hard-wire or radio means 20, to a remote central point where the movements of bottles are controlled in the customer area.

The system can therefore be set up anywhere convenient for making available to passing customers bottles of gas containing a single product or combined products, e.g. nitrogen or argon on the one hand, propane or butane on the other, in cabinets having identifications or colors suitable for the purpose. As an alternative, the individual doors 13 can be protected by a robust main door for the whole of one module A, this main door also having an electromechanical bolt which opens and gives access to the individual doors when an authorized user is recognized, for example from a subscription card, by the transaction module B.

What is claimed is:

1. A system for storing and making available gas bottles, comprising at least one cabinet (A) that has a front face and comprises at least one pair of front-opening compartments connected to access-control means (13), each compartment consisting of a generally half-cylindrical gutter part (5) and an access part (6) whose profile converges toward the gutter part.

2. The system as claimed in claim 1, in which the access part (6) is interchangeable and fixed to the front face.

3. The system as claimed in claim 1, in which the gutter part (5) comprises an adjustable end stop means (11; 11').

4. The system as claimed in claim 1, in which the access part (6) is made of plastic.

5. The system as claimed in claim 4, in which each compartment is equipped with at least one detector (17, 18) for detecting the presence of a bottle.

6. The system as claimed in claim claim 5, comprising an ultrahigh-frequency aerial (18) at the periphery of the access part.

7. The system as claimed in claim 1, in which the gutter part (5) is inclined (α) relative to the horizontal.

8. The system as claimed in claim 5, comprising, for each compartment, a door (13) fitted with a bolt (15).

9. The system as claimed in claim 8, in which the doors (13) are hinged to a panel (14) mounted on the front face.

10. The system as claimed in claim 8, in which the doors (13) are made at least partly of plastic.

11. The system as claimed in claim 9, in which the panel (14) comprises at least one luminous indicator (16) associated with each compartment.

12. The system as claimed in claim 1, in which the cabinet (A) comprises at least two rows of compartments.

13. The system as claimed in claim 12, in which the cabinet (A) is connected to a transaction module (B).

14. The system as claimed in claim 12, in which the transaction module (B) is equipped with remote transmission means (20).

15. The system as claimed in claim 1, in which each compartment is equipped with at least one detector (17, 18) for detecting the presence of a bottle.

16. The system as claimed in claim 1, comprising, for each compartment, a door (13) fitted with a bolt (15).

17. The system as claimed in claim 9, in which the doors (13) are made at least partly of plastic.

* * * * *